Figure 1:
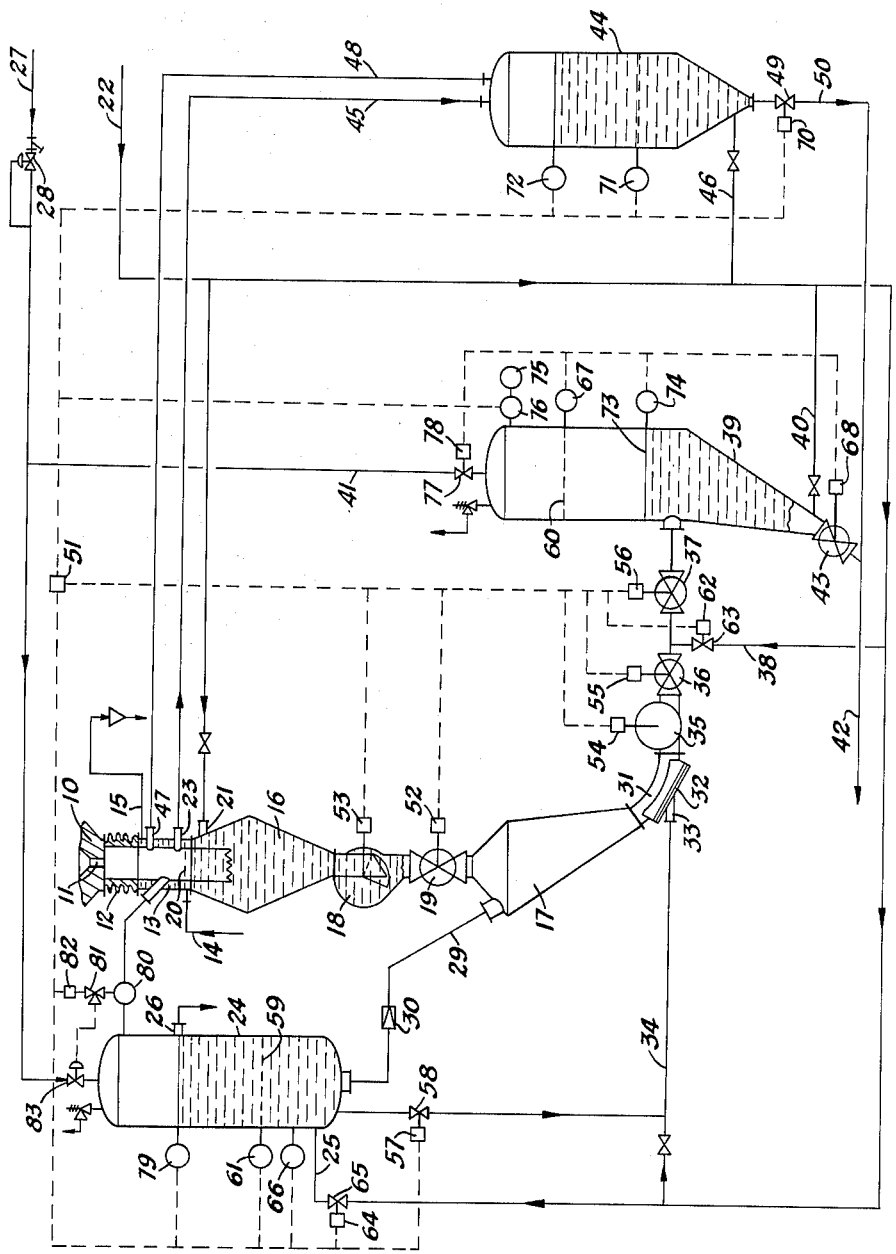

INVENTOR.
REINHARD WALDHOFER

Feb. 15, 1966  R. WALDHOFER  3,235,313
SLUICING SOLID MATERIALS FROM SPACES UNDER
SUPERATMOSPHERIC PRESSURE
Filed May 18, 1964  3 Sheets-Sheet 3

INVENTOR.
REINHARD WALDHOFER
BY David M. Bunnell
his Agent

United States Patent Office 3,235,313
Patented Feb. 15, 1966

3,235,313
SLUICING SOLID MATERIALS FROM SPACES UNDER SUPERATMOSPHERIC PRESSURE
Reinhard Waldhofer, Essen, Germany, assignor, by mesne assignments, to Koppers Company, Inc., Pittsburgh, Pa., a corporation of Delaware
Filed May 18, 1964, Ser. No. 368,285
8 Claims. (Cl. 302—14)

This invention relates generally to the sluicing of solid materials from spaces under superatmospheric pressure and, more particularly, to the sluicing of gasification residues that accumulate in the pressure gasification of finely divided solid fuels in suspension in oxygen. In the present specification "oxygen" designates pure oxygen or also oxygen-enriched air. If desired, the reaction mixture can also be mixed with an endothermically reacting media, such as steam.

In pressure gasification the residues are frequently discharged in the form of liquid slag as a result of the high temperatures prevailing in the gasifier. Conventionally, this slag is withdrawn through a slag discharge opening provided in the bottom of the gasifier, and conducted into a water bath situated therebelow. The slag is granulated in the water bath before it is transferred into sluices and discharge apparatus.

The actual sluicing can be effected, for example, by means of a two-stage sluice tank system, to which is connected a mechanical conveyor that conveys the slag away from the gasification plant.

The high pressures present in such a gasification plant (which can amount to 30 atmospheres and higher) as well as the danger of explosion of the produced gas place high requirements on the operating reliability and the tightness of the sluice system and the necessary cut-off means. These requirements cannot always be reliably fulfilled by the above method.

Therefore, the present invention proceeds in an entirely new way and comprises, in connection with the use of a two-stage, water-filled sluice tank system, discharging the solid materials from the second sluice tank by means of water under gas pressure. The water flows as a result of a pressure difference from a pressure tank, which is arranged ahead of the second sulice tank into a buffer tank connected to the second sluice tank, which is also partially filled with water, under an essentially lower gas pressure. After complete equalization of the pressure, i.e., after the solid materials that have accumulated in the second sluice tank are forced into the buffer tank by the water displaced from the pressure tank, the connecting line between the sluice tank and the buffer tank is closed, and the solid materials are conveyed from the latter by expansion of the cushion of gas that had been compressed during the equalization of pressure. The solid materials are then transferred to a clarifying plant, a screen or the like.

According to another characteristic of the invention, before beginning the sluicing process, the pressures and the water levels in the pressure tank and in the first sluice tank or in the water bath below the pressure space are equalized. A constant and calm water surface is thereby assured during each operating phase.

Another important advantage of the process of the invention is its easy adaptability to operating requirements. Thus, it is possible, merely by selection of the differential pressure between the pressure tank and the buffer tank, to synchronize the sluicing process, i.e., the amount of water displaced by equalization of the pressure, exactly to the amount of solid material that accumulates and must be discharged. Since the pressure in the pressure tank is adjusted to equal the pressure in the pressure space, the differential pressure is varied by changing the pressure of the gas in the buffer tank. Both this gaseous cushion as well as the one in the pressure tank should be of an inert gas for safety reasons. Nitrogen is preferably used as the inert gas in gasification plants, since it is required for other purposes and it is available at sufficient pressure. It should also be noted that no nitrogen losses occur in the new operating process.

Other details of the process of the invention and its operation are explained in the following description when the same is read in conjunction with the accompanying drawings. It is to be expressly understood however that the drawings are not intended as a definition of the invention but are for the purpose of illustration only.

Figure 2:
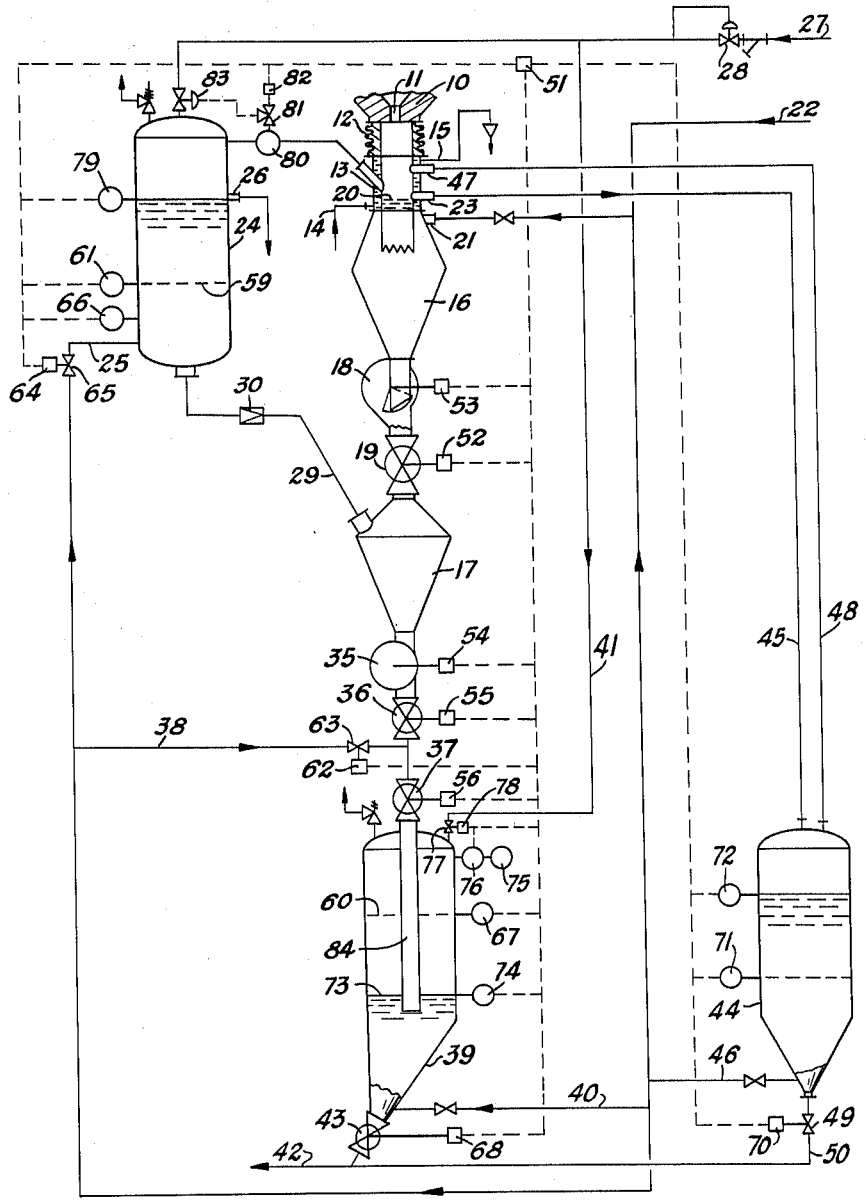
Figure 3:
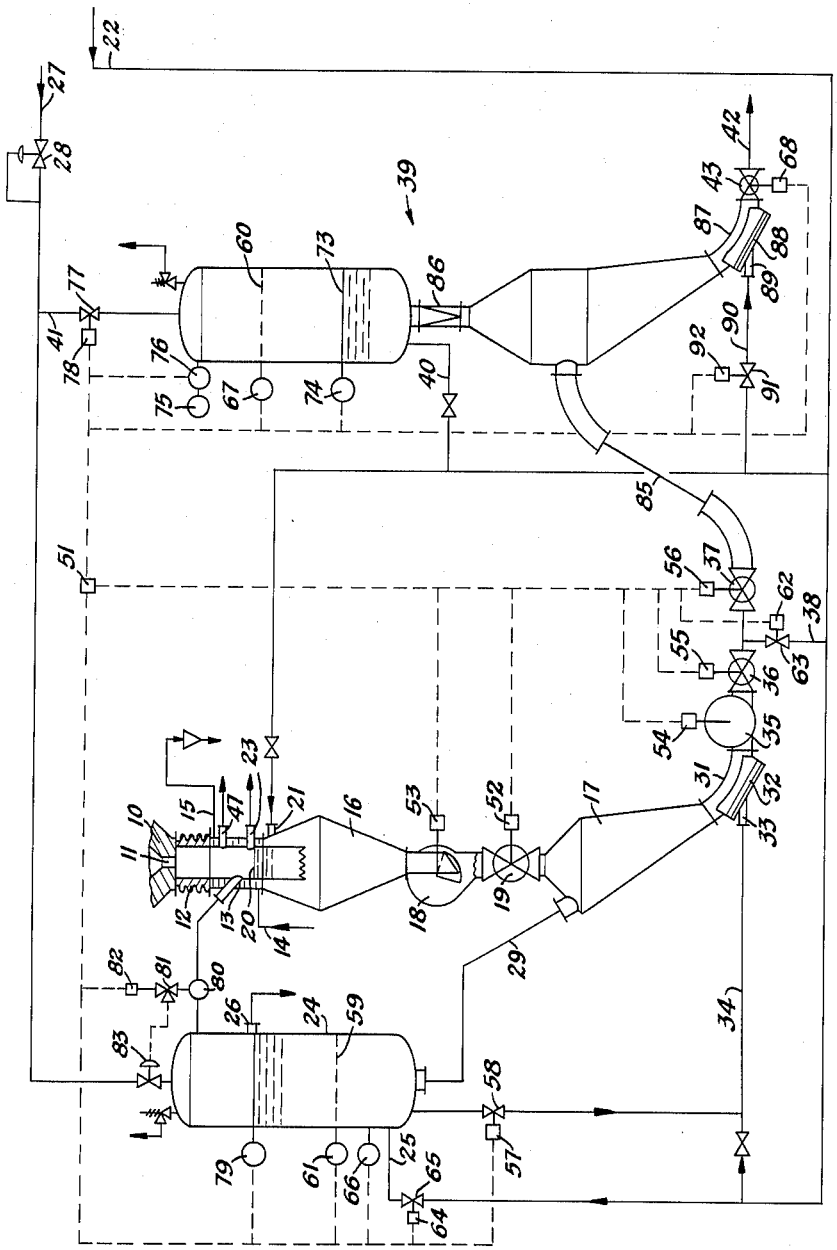

FIGURE 1 schematically illustrates one embodiment of the invention,

FIGURES 2 and 3 schematically illustrate alternate embodiments of the invention.

In FIGURE 1 the lower part of a pressure gasifier is illustrated by 10. A slag channel 11 passes through the lower part of the gasifier. Slag channel 11 is connected at the bottom with a compensator lined with fireproof elastic material and a double jacket 13, through which water flows by way of inlet 14 and outlet 15. The two sluice tanks 16 and 17, which can be disconnected from one another by spherical rotary seal 18 and the ball valve 19, are constantly filled with water, which extends to the lower part of the shaft formed by the compensator 12 and the double jacket 13. A water inlet 21, which is connected to the main line 22 for the pressure water and equalizes the water losses caused by vaporization during the quenching of the slag, and an overflow 23 are provided for maintaining water level 20.

About at the same height as the first sluice tank 16 there is arranged a pressure tank 24, which has a water inlet 25 and an overflow 26 for partially filling it with water to the same level as the water level 20 in the sluice tank system. Compressed nitrogen is present in the upper part of the pressure tank. The compressed nitrogen is supplied through line 27 and pressure control valve 28. Line 29 equipped with butterfly valve 30 connects the pressure tank with the second sluice tank 17.

In the outlet of the downwardly tapered sluice tank 17 there is arranged a curved guide 31 equipped with a sealing plate 32 and a spray nozzle 33, through which pressure water is injected from a branch line 34 for breaking up any plugs of slag that may form in the curved guide. The spherical rotary seal 35 and the ball valves 36 and 37 serve as cut-off means between the sluice tank 17 and the subsequently connected buffer tank. A connection 38 for supplying rinsing water is provided before ball valve 37. In case only large pieces of slag are expected, the insertion of a slag breaker (not illustrated) in sluice tank 17 is recommended.

The buffer tank 39 is also partially filled with water through line 40 and is also under an atmosphere of nitrogen introduced through branch line 41. The buffer tank is disconnected from the slag discharge line by ball valve 43.

Finally, a sluice tank 44 is illustrated in the drawing. Water under pressure flows to it through overflow 23 and line 45 as well as through line 46. Furthermore, it is connected with the gasification space by pipe 47 and line 48, so that the same pressure prevails in it as in the gasifier. After opening valve 49, water under pressure can be removed from the sluice tank through line 50 for assisting the transportation of the slag in line 42.

The operation of the invention conforming to FIGURE 1 is as follows:

The entire operation is controlled electrohydraulically or electropneumatically by a time relay 51 together with impulse lines to all control elements and valves. The pressure in the gasifier amounts to about 30 atmospheres; the pressure of the nitrogen in line 27 and the water in line 22 is 36 atmospheres. The differential pressure between the pressure tank 24 and the buffer tank 39 is selected at 23 atmospheres, i.e., the buffer tank is under a nitrogen pressure of 7 atmospheres.

The liquid slag discharged from the gasifier through slag channel 11 falls continuously into the water bath situated therebelow, where it is granulated and collected above the closed spherical rotary seal 18.

The time relay 51 is actuated after the pressure in the gasifier 10 and the pressure tank 24 and the water level in the pressure tank 24 and in the sluice tank system have been adjusted so as to be the same. In this example the pressure tank is ⅔ filled with water under the above-cited pressure conditions. Relay 51 opens ball valve 19 by way of control element 52 and then opens the spherical rotary seal 18 by way of final control element 53. The slag collected in the first sluice tank 16 then falls into the second sluice tank 17.

The spherical rotary seal 18 and the ball valve 19 are again closed by the time relay. The spherical rotary seal 35, ball valve 37, and ball valve 36 are then opened by means of control elements 54, 56, and 55; furthermore, ball valve 58 is opened by control element 57. The slag is forced by the water displaced by nitrogen in pressure tank 24 from the sluice tank 17 into the buffer tank 39. Any obstructions are simultaneously prevented by water under pressure flowing through line 34 and nozzle 32 into the curved guide 31. The rate of sluicing can be optionally regulated by means of the butterfly valve 30 in line 29.

After reaching a prescribed water level 59, which here constitutes ⅓ of the volume of the tank and at which the pressure in the pressure tank has dropped to 15 atmospheres, while the nitrogen in the buffer tank 39 is compressed to one-half of its volume, thus to 14 atmospheres, the low level sounding device 61 transmits an impulse to the time relay 51, which closes ball valve 36, spherical rotary seal 35 and ball valve 58. Ball valve 63 is then opened by control element 62 whereby water under pressure flows in and freely rinses the sealing surfaces on the ball valve 37. Ball valve 65 is simultaneously opened by control element 64 and water under pressure flows through line 25 into the pressure tank 24. A sounding device 66 provided on the pressure tank sets off an alarm if the water level goes below 59.

When the water in buffer tank 39 rises to level 60, the maximum level sounding device 67 transmits an impulse to the time relay and results in a closing of the ball valves 63 and 37, while ball valve 43 is opened by control element 68. The nitrogen cushion in the buffer tank is expanded and forces the slag accumulated in the lower part of the tank through line 42 from which it is transferred to a screen, clarifying plant or the like. Ball valve 49 is opened by control element 70 for assisting the transportation of the slag, and additional washing water flows from the sluice tank 44 through line 50 into line 42. This tank is also provided with minimum and maximum level sounding devices 71 and 72, respectively.

When the water in buffer tank 39 reaches level 73, ball valve 43 is again closed by the minimum level sounding device 74 by way of time relay 51. The sluicing process is completed thereby and the nitrogen pressure in the buffer tank is again adjusted by means of pressure indicator 75, switch 76 and valve 77 together with control element 78.

When the water level in the pressure tank 24 reaches its prescribed maximum level by the inflowing pressure water, the sounding device 79 transmits an impulse to time relay switch 51 and ball valve 65 is closed. Before the next sluicing begins, the pressure between the gasifier and the pressure tank is first equalized. This is done by pressure-equalizer regulator 80, three-way valve 81, coil 82 and regulating valve 83.

FIGURE 2, which has the same reference numerals as FIGURE 1, illustrates another embodiment of a slag sluice. In this case the buffer tank 39 is arranged underneath the sluice tank 17 so that the curved guide 31 conforming to FIGURE 1 and means for rinsing it with water are omitted. However, a dip pipe 84 is provided through which the slag is directly conducted to the lower part of the buffer tank and a calm water surface is obtained. The operating sequence in this apparatus corresponds to that described with reference to FIGURE 1.

Finally, FIGURE 3 illustrates an arrangement which can be installed particularly where the structure must be as low as possible. It has been shown that the solid materials can also be transported upwardly without difficulty by means of the process of the invention. Behind the ball valve 37, there is provided an upwardly directed line 85 through which the slag is forced into the buffer tank 39. Up to this point, the operation is similar to that described for FIGURE 1. The buffer tank 39 is constructed as a double tank. A butterfly valve 86 is inserted between the two sections. The lower part of the buffer tank, which is constantly filled with water, is the same as the second sluice tank 17 and also has a curved guide 87 with sealing plate 88, spray nozzle 89 and water supply line 90 which is opened by valve 91 by means of control element 92. A sluice tank, which is not illustrated, can also be inserted here for assisting the transportation of the slag. The function of this sluice tank, however, is the same as explained for FIGURE 1.

The invention has a number of additional advantages besides those already mentioned. The outlet side of the ball valve 19 can never be without pressure. Furthermore, by the arrangement of the buffer tank 39, a deficiency of water in the sluicing system is no longer possible. In case of a failure of the control mechanism and a simultaneous leak at ball valve 19, the pressure in the entire system is increased by the inflowing water and any escape of gas is thereby prevented. Furthermore, free spaces, in which gas could enter, cannot form. The consumption of pressure water is extremely low and depends on the amount of discharged slag.

I claim:

1. A process for sluicing solid materials from spaces under superatmospheric pressure particularly those employed for the gasification of finely divided solid fuels suspended in oxygen comprising: discharging said solid materials from a space under superatmospheric pressure into the first of a pair of water filled sluice zones, conducting said solid materials from the first of said sluice zones to the second of said sluice zones, placing a water supply under a gas pressure, flowing water from said supply through said second sluice zone to a buffer zone which is under a lower gas pressure such that said solid materials are discharged from said second sluice zone into said buffer zone, isolating said buffer zone from said second sluice zone, and discharging said solid materials from said buffer zone by permitting the expansion of the gas cushion created by the inflow of water and solids into said buffer zone from said supply and said second sluice zone.

2. The process as defined in claim 1 in which the gas pressure and the water level in said water supply are adjusted so that they are the same as those in said first sluice zone before beginning the sluicing.

3. The process as defined in claim 1 in which the sluicing rate is varied by adjusting the pressure differential between said water supply and said buffer zone.

4. The process as defined in claim 1 in which an inert gas is used as a gas cushion in said water supply and said buffer zone.

5. An apparatus for sluicing solid materials from spaces under superatmospheric pressure particularly those employed for the gasification of finely divided solid fuels suspended in oxygen comprising: first and second sluice tanks adapted to be filled with water, means for discharging said solid materials from a space under superatmospheric pressure into the first sluice tank, means for conducting said solid materials from said first sluice tank to the second sluice tank, a pressure tank containing water under a gas pressure, a buffer tank, means for flowing water from said pressure tank under a gas pressure through said second sluice tank to said buffer tank which is under a gas pressure less than the water in said pressure tank whereby said flow of water discharges said solid material from said second sluice tank into said buffer tank, means for isolating said buffer tank from said second sluice tank and means for discharging said solid materials from said buffer tank by permitting the expansion of the gas cushion created by the inflow of water and solids into said buffer tank from said pressure tank and said second sluice tank.

6. The apparatus of claim 5 wherein means are provided to adjust the gas pressure and water level in said pressure tank to equal the gas pressure and water level in said first sluice tank.

7. The apparatus of claim 5 wherein said means for flowing water from said pressure tank through said second sluice tank includes a butterfly valve for regulating the sluicing rate.

8. The apparatus of claim 5 wherein said buffer tank is constructed in upper and lower sections which are separated by a butterfly valve such that said valve regulates the sluicing rate.

References Cited by the Examiner
UNITED STATES PATENTS 3,175,566  3/1965  Daniels _____ 302—14

HUGO O. SCHULZ, *Primary Examiner.*

ANDRES H. NIELSEN, *Assistant Examiner.*